US008995831B2

(12) United States Patent
Li et al.

(10) Patent No.: US 8,995,831 B2
(45) Date of Patent: Mar. 31, 2015

(54) METHOD AND APPARATUS FOR PROCESSING OPTICAL SIGNALS

(71) Applicant: Huawei Technologies Co., Ltd., Shenzhen (CN)

(72) Inventors: Liangchuan Li, Shenzhen (CN); Ling Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 13/664,134

(22) Filed: Oct. 30, 2012

(65) Prior Publication Data

US 2013/0058649 A1 Mar. 7, 2013

Related U.S. Application Data

(63) Continuation of application No. PCT/CN2011/074979, filed on May 31, 2011.

(51) Int. Cl.
H04J 14/00 (2006.01)
H04J 14/06 (2006.01)
(Continued)

(52) U.S. Cl.
CPC ................. H04B 10/2572 (2013.01)
USPC ............ 398/43; 398/65; 398/152; 398/184; 398/205

(58) Field of Classification Search
CPC .... H04B 10/2572; H04B 10/00; H04B 10/25; H04B 10/2507; G02B 6/00
USPC ................ 398/43, 65, 152, 184, 205
See application file for complete search history.

(56) References Cited

U.S. PATENT DOCUMENTS 6,967,988 B1 * 11/2005 Wedding ................ 375/142
7,035,548 B2 * 4/2006 Ooi et al. ................ 398/159
(Continued)

FOREIGN PATENT DOCUMENTS

CN 1545227 A 11/2004
CN 1682472 A 10/2005
(Continued)

OTHER PUBLICATIONS

Search Report issued in corresponding Chinese Patent Application No. 201180000521.1, dated Oct. 23, 2012.
(Continued)

Primary Examiner — Ken Vanderpuye
Assistant Examiner — Abbas H Alagheband
(74) Attorney, Agent, or Firm — Brinks Gilson & Lione

(57) ABSTRACT

A method for processing optical signals includes performing frequency mixing, photoelectric detection, analog/digital conversion, and dispersion compensation on received input optical signals. First-path polarization multiplexing optical signals and second-path polarization multiplexing optical signals. An initialization update process is performed on filter coefficients. Polarization compensation is performed on the first-path polarization multiplexing optical signals and the second-path polarization multiplexing optical signals by using the filter coefficients on which the initialization update is performed to obtain initialized x-path optical signals and initialized y-path optical signals. Preset x-path training sequences and y-path training sequences are synchronized by using the initialized x-path optical signals and the initialized y-path optical signals. If a synchronization result indicates that polarization cross occurs, the polarization cross is rectified.

15 Claims, 5 Drawing Sheets

(51) Int. Cl.
*H04B 10/00* (2013.01)
*H04B 10/12* (2006.01)
*H04B 10/06* (2006.01)
*H04B 10/2507* (2013.01)

(56) References Cited

U.S. PATENT DOCUMENTS

| | | | | |
|---|---|---|---|---|
| 7,636,525 | B1* | 12/2009 | Bontu et al. | 398/208 |
| 8,086,114 | B2* | 12/2011 | Liu et al. | 398/208 |
| 8,472,813 | B2* | 6/2013 | Cvijetic et al. | 398/205 |
| 8,532,502 | B2* | 9/2013 | Zhang et al. | 398/206 |
| 8,538,278 | B2* | 9/2013 | Batshon et al. | 398/205 |
| 2004/0067057 | A1* | 4/2004 | Akiyama et al. | 398/26 |
| 2004/0161101 | A1* | 8/2004 | Yiu et al. | 379/406.01 |
| 2005/0041986 | A1* | 2/2005 | Bulow | 398/208 |
| 2005/0196176 | A1* | 9/2005 | Sun et al. | 398/152 |
| 2005/0286904 | A1* | 12/2005 | Calabro et al. | 398/152 |
| 2006/0007197 | A1 | 1/2006 | Gilbert | |
| 2007/0092259 | A1* | 4/2007 | Bontu et al. | 398/147 |
| 2007/0092260 | A1* | 4/2007 | Bontu et al. | 398/152 |
| 2008/0152363 | A1* | 6/2008 | Koc | 398/208 |
| 2009/0087194 | A1* | 4/2009 | Nakashima et al. | 398/158 |
| 2009/0148164 | A1* | 6/2009 | Roberts et al. | 398/65 |
| 2009/0201796 | A1* | 8/2009 | Roberts et al. | 370/210 |
| 2009/0245809 | A1* | 10/2009 | Nakamoto | 398/159 |
| 2009/0245816 | A1* | 10/2009 | Liu et al. | 398/208 |
| 2010/0003028 | A1* | 1/2010 | Zhang et al. | 398/65 |
| 2010/0111531 | A1* | 5/2010 | Tanimura et al. | 398/65 |
| 2010/0142952 | A1* | 6/2010 | Qian et al. | 398/65 |
| 2010/0215371 | A1* | 8/2010 | Djordevia et al. | 398/79 |
| 2010/0329677 | A1* | 12/2010 | Kaneda et al. | 398/65 |
| 2011/0008059 | A1* | 1/2011 | Chang et al. | 398/202 |
| 2011/0033184 | A1* | 2/2011 | Zhang et al. | 398/65 |
| 2011/0103795 | A1* | 5/2011 | Khandani et al. | 398/65 |
| 2011/0182589 | A1* | 7/2011 | Kotake et al. | 398/152 |
| 2011/0194855 | A1* | 8/2011 | Batshon et al. | 398/65 |
| 2011/0243573 | A1* | 10/2011 | Roberts et al. | 398/152 |
| 2011/0243575 | A1* | 10/2011 | Yan et al. | 398/205 |
| 2011/0249971 | A1* | 10/2011 | Oda et al. | 398/65 |
| 2012/0084619 | A1* | 4/2012 | Kuschnerov et al. | 714/752 |
| 2012/0224852 | A1* | 9/2012 | Liu et al. | 398/65 |
| 2012/0251110 | A1* | 10/2012 | Cvijetic et al. | 398/65 |
| 2012/0269513 | A1* | 10/2012 | Abe | 398/65 |
| 2013/0058649 | A1* | 3/2013 | Li et al. | 398/43 |

FOREIGN PATENT DOCUMENTS

| | | |
|---|---|---|
| CN | 1790948 A | 6/2006 |
| CN | 1902540 A | 1/2007 |
| CN | 1961585 A | 5/2007 |

OTHER PUBLICATIONS

English Translation of International Search Report issued in corresponding PCT Application No. PCT/2011/074979; mailed Feb. 16, 2012.

Rasmussen et al., "Advances in coherent detection algorithms" Coherent Optical Communication: Components Subsystems, and Systems, Proc. of SPIE vol. 7960, 796002, 2011. 10 pages.

* cited by examiner

METHOD AND APPARATUS FOR PROCESSING OPTICAL SIGNALS

CROSS-REFERENCE TO RELATED APPLICATIONS

This application is a continuation of International Application No. PCT/CN2011/074979, filed on May 31, 2011, which is hereby incorporated by reference in its entirety.

FIELD OF THE APPLICATION

The present application relates to the field of signal processing, and in particular, to a method and an apparatus for processing optical signals.

BACKGROUND OF THE APPLICATION

To improve the optical signal transmission efficiency, in the prior art, two orthogonal polarization states of the optical signal are used to transmit two independent optical signals at the same time in the same bandwidth through polarization multiplexing, so as to double the channel transmission efficiency.

Compared with a direct detection manner, coherent technologies between the two orthogonal polarization states of the optical signal can produce an optical-signal-to-noise ratio gain about 3 dB, and can fully compensate effects of Chromatic dispersion (CD, Chromatic Dispersion) and polarization mode dispersion (PMD, Polarization Mode Dispersion) in the channel through electric equalization technologies. Over 100 Gb/s long-distance transmission may be implemented by using polarization multiplexing combined with coherent receiving technologies.

A typical polarization multiplexing coherent receiver in the prior art is specifically as shown in FIG. 1. The received optical signals are divided into x/y-path signals through a polarization beam splitter 101, and the x/y-path signals are fed into 90° frequency mixers 103$x$ and 103$y$, and then digital signals $I_x$, $Q_x$, $I_y$, and $Q_y$ with sampling of N times (N is generally 2) are obtained through a photoelectric detector 104 and an analog/digital converter 105.

$I_x$, $Q_x$, $I_y$, and $Q_y$ are input into x/y-path dispersion compensators 106$x$ and 106$y$ for dispersion compensation, respectively, and a synchronizer 110 synchronizes training sequences after the completion of dispersion compensation, that is, the synchronizer 110 correlates the signals on which dispersion compensation is performed with the training sequences to obtain a correlated peak. Then, a synchronization result is obtained according to the correlated peak, and a condition of polarization cross is determined according to the synchronization result, so that a polarization compensator 107 adjusts filter coefficients.

Afterwards, the signals on which the dispersion compensation is performed are input into the polarization compensator 107 to complete polarization de-multiplexing and equalization, and then the training sequences and the equalized signals are input into phase restorers 108$x$ and 108$y$ respectively for phase restoration and finally input into decoders 109$x$ and 109$y$, so as to restore and obtain original bit stream data.

However, in the prior art, during the synchronization of the training sequences, the signals after dispersion compensation are correlated with the training sequences to obtain the correlated peak. At this time, the x-path of signals and the y-path of signals are mixed together, so that the x-path signals and the y-path signals both have great impairment. If the x-path signals are directly correlated with the x-path training sequences, or the y-path signals are directly correlated with the y-path training sequences, a condition that a peak is unobvious or multiple peaks exist may occur, and therefore, it is easy to cause incorrect synchronization of the training sequences, thereby reducing synchronization stability of the signals.

SUMMARY OF THE APPLICATION

The embodiments described below provide a method and an apparatus for processing signals, which can effectively improve synchronization stability of the signals.

An embodiment provides a method for processing optical signals, where the method includes:

performing frequency mixing, photoelectric detection, analog/digital conversion, and dispersion compensation on received input signals, and then obtaining first-path polarization multiplexing signals and second-path polarization multiplexing signals; performing an initialization update process on filter coefficients, and performing polarization compensation on the first-path polarization multiplexing signals and the second-path polarization multiplexing signals by using the filter coefficients on which the initialization update is performed, so as to obtain initialized x-path signals and initialized y-path signals; synchronizing preset x-path training sequences and y-path training sequences by using the initialized x-path signals and the initialized y-path signals; and if the synchronization result indicates that polarization cross occurs, rectifying the polarization cross.

An embodiment provides an apparatus for processing signals, where the apparatus includes:

a frequency mixer, configured to perform frequency mixing on received input signals; a photoelectric detector, configured to perform photoelectric detection on the signals on which the frequency mixing is performed; an analog/digital converter, configured to perform analog/digital conversion on the signals on which the photoelectric detection is performed; a dispersion compensator, configured to perform dispersion compensation on the signals on which the analog/digital conversion is performed, so as to obtain first-path polarization multiplexing signals and second-path polarization multiplexing signals; a polarization compensator, configured to perform an initialization update process on filter coefficients, and perform polarization compensation on the first-path polarization multiplexing signals and the second-path polarization multiplexing signals by using the filter coefficients on which the initialization update is performed, so as to obtain initialized x-path signals and initialized y-path signals; and a synchronizer, configured to synchronize preset x-path training sequences and y-path training sequences by using the initialized x-path signals and the initialized y-path signals, and if the synchronization result indicates that polarization cross occurs, rectify the polarization cross.

The embodiments have the following beneficial effects.

In the embodiments, after obtaining the first-path polarization multiplexing signals and the second-path polarization multiplexing signals, the apparatus for processing signals may first perform polarization compensation on the first-path polarization multiplexing signals and the second-path polarization multiplexing signals, and then perform synchronization of the training sequences. Since the signals of different paths may be separated through the polarization compensation, during synchronization of the training sequences, impairment of the signals may not affect the synchronization, thereby effectively improving synchronization stability of the signals.

BRIEF DESCRIPTION OF THE DRAWINGS

FIG. 4 is a schematic diagram of an apparatus for processing signals according to an embodiment;

DETAILED DESCRIPTION OF THE EMBODIMENTS

The embodiments described below provide a method and an apparatus for processing optical signals, which can effectively improve synchronization stability of optical signals.

Figure 1:
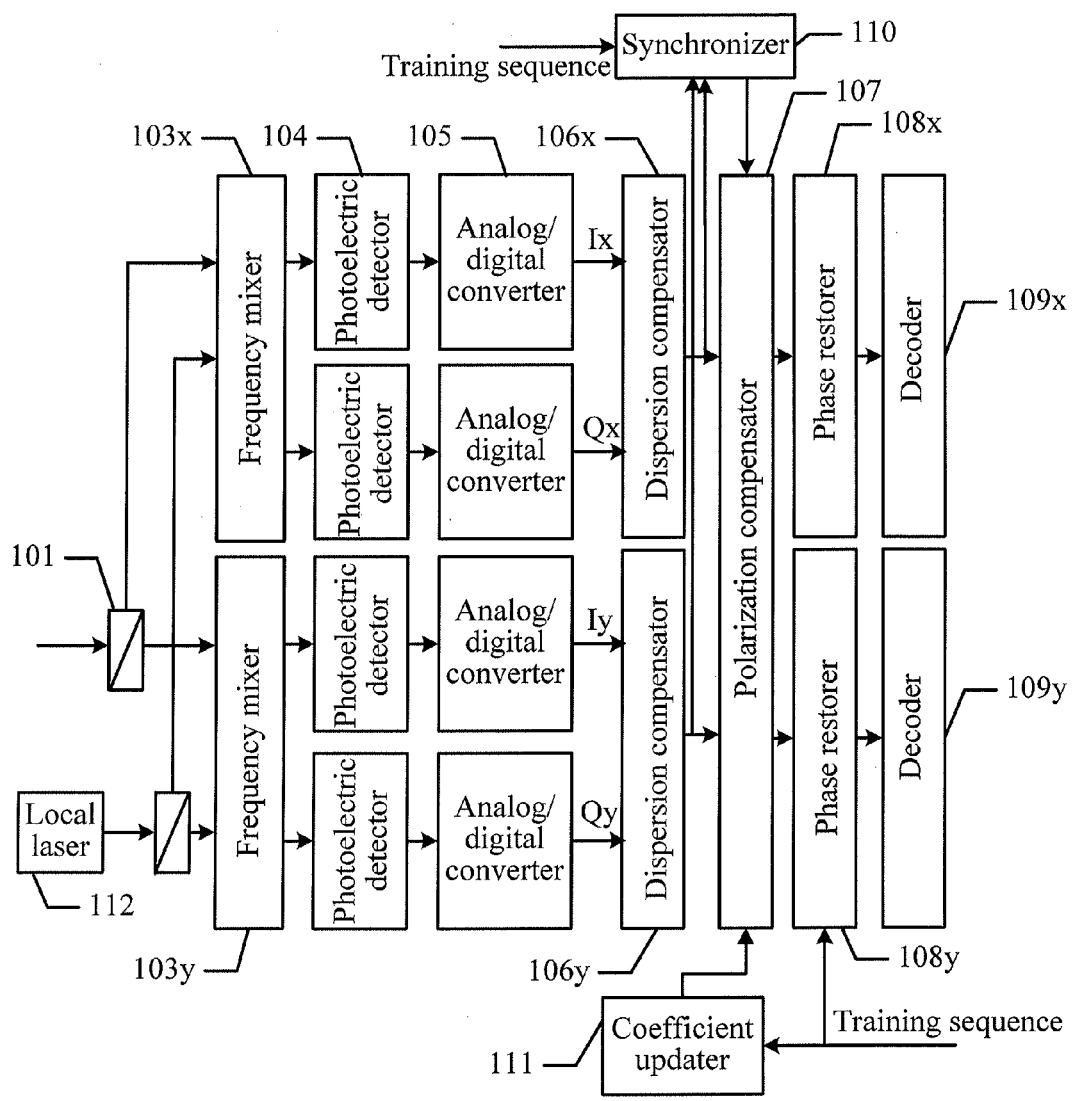
FIG. 1 is a schematic flow chart of processing signals in the prior art.
Figure 2:
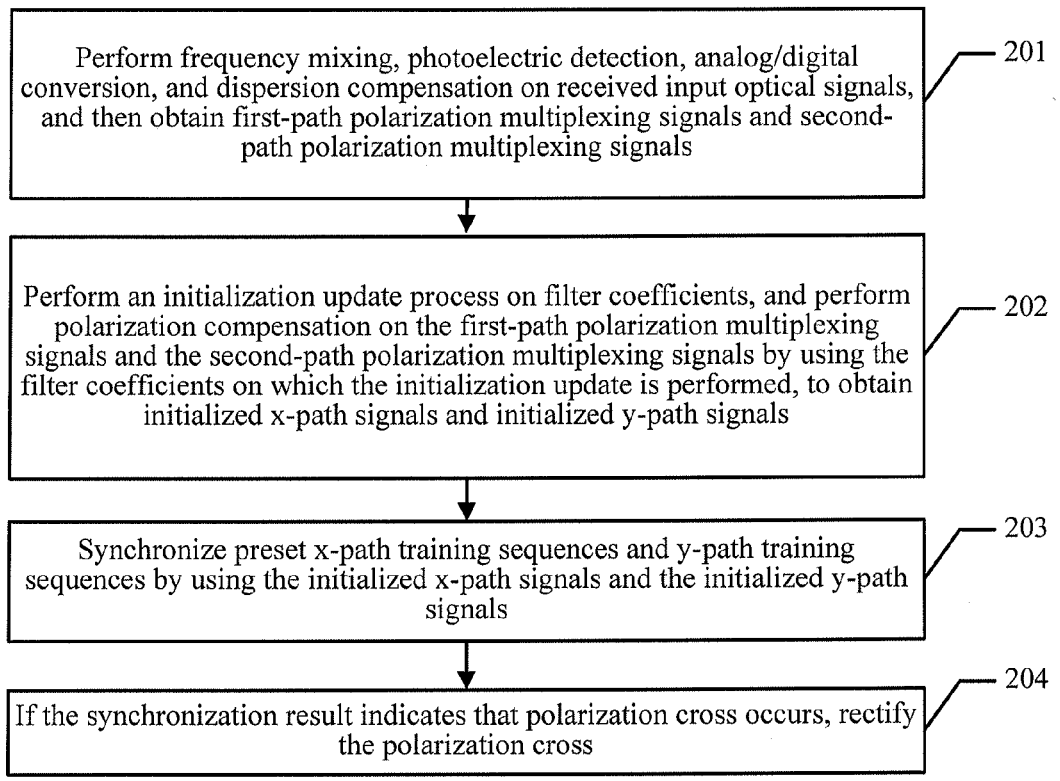
FIG. 2 is a schematic diagram of an embodiment of a method for processing signals according to an embodiment.

Referring to FIG. 2, an embodiment of a method for processing signals includes the following steps.

201: Perform frequency mixing, photoelectric detection, analog/digital conversion, and dispersion compensation on received input signals, and then obtain first-path polarization multiplexing signals and second-path polarization multiplexing signals.

In this embodiment, an apparatus for processing signals may receive input signals, and then perform frequency mixing, photoelectric detection, analog/digital conversion, and dispersion compensation on the input signals and local oscillation signals generated by a local laser, to obtain the first-path polarization multiplexing signals and the second-path polarization multiplexing signals.

The details about the process of frequency mixing, photoelectric detection, analog/digital conversion, and dispersion compensation are not limited herein.

202: Perform an initialization update process on filter coefficients, and perform polarization compensation on the first-path polarization multiplexing signals and the second-path polarization multiplexing signals by using the filter coefficients on which the initialization update is performed, so as to obtain initialized x-path signals and initialized y-path signals.

In this embodiment, a polarization compensator in the apparatus for processing signals may adopt an adaptive filter for implementation, and may perform an initialization update process on filter coefficients of the polarization compensator after obtaining the first-path polarization multiplexing signals and the second-path polarization multiplexing signals, and further perform polarization compensation on the first-path polarization multiplexing signals and the second-path polarization multiplexing signals by using the filter coefficients on which the initialization update is performed, to obtain initialized x-path signals and initialized y-path signals.

203: Synchronize preset x-path training sequences and y-path training sequences by using the initialized x-path signals and the initialized y-path signals.

After obtaining the initialized x-path signals and the initialized y-path signals through the polarization compensation, the apparatus for processing signals may synchronize the preset x-path training sequences and y-path training sequences by using the initialized x-path signals and the initialized y-path signals.

It should be noted that, in this embodiment, the apparatus for processing signals is preset with the x-path training sequences and y-path training sequences.

204: If the synchronization result indicates that polarization cross occurs, rectify the polarization cross.

The apparatus for processing signals synchronizes the preset x-path training sequences and y-path training sequences by using the initialized x-path signals and the initialized y-path signals, and then may determine whether polarization cross occurs according to the synchronization result. If the polarization cross occurs, the apparatus for processing signals may rectify the polarization cross.

In this embodiment, after obtaining the first-path polarization multiplexing signals and the second-path polarization multiplexing signals, the apparatus for processing signals may first perform polarization compensation on the first-path polarization multiplexing signals and the second-path polarization multiplexing signals, and then perform synchronization of the training sequences. Since the signals of different paths may be separated through the polarization compensation, during synchronization of the training sequences, impairment of the signals may not affect the synchronization, thereby effectively improving synchronization stability of the signals.

Figure 3:
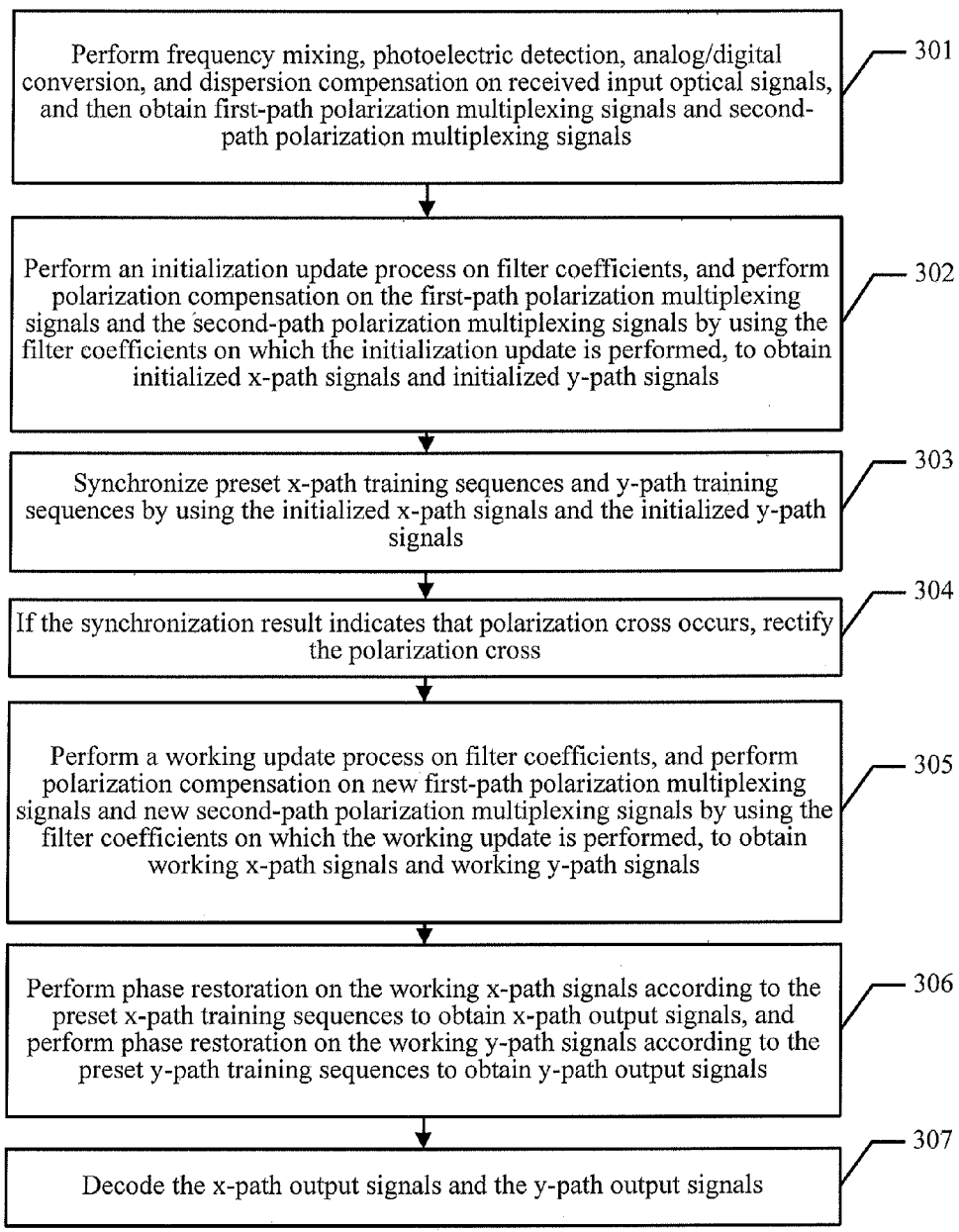
FIG. 3 is a schematic diagram of another embodiment of a method for processing signals according to an embodiment.

For ease of understanding, the method for processing signals is described in detail below through a specific example. Referring to FIG. 3, another embodiment of the method for processing signals includes the following steps.

301: Perform frequency mixing, photoelectric detection, analog/digital conversion, and dispersion compensation on received input signals, and then obtain first-path polarization multiplexing signals and second-path polarization multiplexing signals.

In this embodiment, an apparatus for processing signals may receive the input signals, and then input the input signals and local oscillation signals generated by a local laser into two frequency mixers for frequency mixing processing to obtain four paths of frequency mixing signals.

The four paths of frequency mixing signals are input into four photoelectric detectors respectively for photoelectric detection, and then four paths of detection signals are output after completion of the photoelectric detection.

The four paths of detection signals are input into four analog/digital converters respectively for analog/digital conversion, and four paths of digital signals are output after completion of the analog/digital conversion, which are $I_x$, $Q_x$, $I_y$, and $Q_y$, respectively.

$I_x$ and $Q_x$ are input into one dispersion compensator for dispersion compensation, and then first-path polarization multiplexing signals are output. $I_y$ and $Q_y$ are input into another dispersion compensator for dispersion compensation, and then second-path polarization multiplexing signals are output.

The details about the process of frequency mixing, photoelectric detection, analog/digital conversion, and dispersion compensation are not limited herein.

302: Perform an initialization update process on filter coefficients, and perform polarization compensation on the first-path polarization multiplexing signals and the second-path polarization multiplexing signals by using the filter coefficients on which the initialization update is performed, to obtain initialized x-path signals and initialized y-path signals.

In this embodiment, a polarization compensator in the apparatus for processing signals may adopt an adaptive filter for implementation, and may perform an initialization update process on filter coefficients of the polarization compensator after obtaining the first-path polarization multiplexing signals and the second-path polarization multiplexing signals.

The initialization update process refers to update of the filter coefficients in an initialization state. It should be noted that, upon a startup operation, the apparatus for processing signals in this embodiment may first get into an initialization state to perform operations such as parameter debug and rectification of polarization cross.

After the update of the filter coefficients, polarization compensation may be performed on the first-path polarization multiplexing signals by using the filter coefficients of an x-path filter which have undergone the initialization update, to obtain initialized x-path signals, and polarization compensation may be performed on the second-path polarization multiplexing signals by using the filter coefficients of a y-path filter which have undergone the initialization update, to obtain initialized y-path signals.

The initialization update process in this embodiment may specifically adopt blind equalization coefficient update, and the specific update manner may be as follows.

A constant modulus algorithm is applied, and the modulus of the initialized x-path signals and the modulus of the initialized y-path signals are kept constant, where the initialized x-path signals and the initialized y-path signals are output by the polarization compensator. Since the input first-path polarization multiplexing signals and the input second-path polarization multiplexing signals may dynamically change, the filter coefficients may be updated according to a constant modulus principle.

It should be noted that, the blind equalization coefficient update may be blind equalization coefficient update without decision feedback.

303: Synchronize preset x-path training sequences and y-path training sequences by using the initialized x-path signals and the initialized y-path signals.

After obtaining the initialized x-path signals and the initialized y-path signals through polarization compensation, the apparatus for processing signals may synchronize the preset x-path training sequences and the preset y-path training sequences by using the initialized x-path signals and the initialized y-path signals.

It should be noted that, in this embodiment, the apparatus for processing signals is preset with the x-path training sequences and y-path training sequences.

The specific synchronization process may be as follows.

The initialized x-path signals are correlated with the x-path training sequences to obtain a first correlated peak, the initialized y-path signals are correlated with the y-path training sequences to obtain a second correlated peak, the initialized x-path signals are correlated with the y-path training sequences to obtain a third correlated peak, and the initialized y-path signals are correlated with the x-path training sequences to obtain a fourth correlated peak.

304: If the synchronization result indicates that polarization cross occurs, rectify the polarization cross.

In this embodiment, if the first correlated peak and the second correlated peak are both greater than or equal to a preset threshold, and the third correlated peak and the fourth correlated peak are both less than the preset threshold, it is determined that the polarization cross does not occur.

If the third correlated peak and the fourth correlated peak are both greater than or equal to the preset threshold, and the first correlated peak and the second correlated peak are both less than the preset threshold, it is determined that the polarization cross occurs.

When the apparatus for processing signals determines that the polarization cross occurs, the filter coefficients of the x-path filter and the filter coefficients of the y-path filter in the polarization compensator may be exchanged, that is, the filter coefficients of the x-path filter are swapped for the filter coefficients of the y-path filter. After the swap of the filter coefficients, the x-path filter may be enabled to output the initialized x-path signals and the y-path filter may be enabled to output the initialized y-path signals, so as to rectify the polarization cross.

It should be noted that, if the synchronization result indicates that polarization cross does not occur, step 305 may be directly executed.

305: Perform a working update process on the filter coefficients, and perform polarization compensation on new first-path polarization multiplexing signals and new second-path polarization multiplexing signals by using the filter coefficients on which the working update is performed, to obtain working x-path signals and working y-path signals.

In this embodiment, after completing the operations such as the parameter debug and the rectification of polarization cross, the apparatus for processing signals may be switched to a working state. Then, the apparatus for processing signals performs processing such as frequency mixing, photoelectric detection, analog/digital conversion and dispersion compensation on newly received input signals in the same way, and obtains new first-path polarization multiplexing signals and new second-path polarization multiplexing signals.

The apparatus for processing signals in the working state may perform the working update process on the filter coefficients of the polarization compensator.

The working update process in this embodiment may specifically adopt blind equalization coefficient update, and the specific update manner may be as follows.

A constant modulus algorithm is applied, and the modulus of the working x-path signals and the modulus of the working y-path signals are kept constant, where the working x-path signals and the working y-path signals are output by the polarization compensator. Since newly input first-path polarization multiplexing signals and newly input second-path polarization multiplexing signals may dynamically change, the filter coefficients may be updated according to a constant modulus principle.

It should be noted that, the blind equalization coefficient update may be blind equalization coefficient update without decision feedback or may also be blind equalization coefficient update with decision feedback.

It can be understood that, in actual applications, the working update process may be performed through other manners in addition to the adoption of blind equalization coefficient update, such as the adoption of training sequence auxiliary coefficient update, and the specific update manner may be as follows.

The apparatus for processing signals updates the filter coefficients with the training sequences as a target, and makes them approximate the training sequences as much as possible. The filter coefficients of the x-path filter are updated by using the x-path training sequences, and the filter coefficients of the y-path filter are updated by using the y-path training sequences.

306: Perform phase restoration on the working x-path signals according to the preset x-path training sequences to obtain x-path output signals, and perform phase restoration on the working y-path signals according to the preset y-path training sequences to obtain y-path output signals.

In this embodiment, after obtaining the working x-path signals and the working y-path signals, the apparatus for processing signals may perform phase restoration on the working x-path signals according to the preset x-path training sequences to obtain x-path output signals, and perform phase restoration on the working y-path signals according to the preset y-path training sequences to obtain y-path output signals.

The specific phase restoration manner may be as follows.

The apparatus for processing signals estimates an initial phase of the working x-path signals by using periodical x-path training sequences, and then according to the initial phase of the working x-path signals, tracks the phase change of the working x-path signals by using a phase locked loop, so as to perform phase restoration.

The manner of performing phase restoration on the working y-path signals is similar, and details are not described herein again.

307: Decode the x-path output signals and the y-path output signals.

After obtaining the x-path output signals and the y-path output signals, the apparatus for processing signals may decode the x-path output signals and the y-path output signals to obtain original signals, and the specific process is not limited herein.

In this embodiment, after obtaining the first-path polarization multiplexing signals and the second-path polarization multiplexing signals, the apparatus for processing signals may first perform polarization compensation on the first-path polarization multiplexing signals and the second-path polarization multiplexing signals, and then perform synchronization of the training sequences. Since the signals of different paths may be separated through the polarization compensation, during synchronization of the training sequences, impairment of the signals may not affect the synchronization, thereby effectively improving synchronization stability of the signals.

In this embodiment, when updating the filter coefficients, the apparatus for processing signals may adopt blind equalization coefficient update or training sequence auxiliary coefficient update, so as to improve flexibility of the solution.

The method for processing signals is described above, and an apparatus for processing signals is described below. Referring to FIG. 4, an embodiment of the apparatus for processing signals includes:

a frequency mixer 403, configured to perform frequency mixing on received input signals;

a photoelectric detector 404, configured to perform photoelectric detection on the signals on which the frequency mixing is performed;

an analog/digital converter 405, configured to perform analog/digital conversion on the signals on which the photoelectric detection is performed;

a dispersion compensator 406, configured to perform dispersion compensation on the signals on which the analog/digital conversion is performed, to obtain first-path polarization multiplexing signals and second-path polarization multiplexing signals;

a polarization compensator 407, configured to perform an initialization update process on filter coefficients, and perform polarization compensation on the first-path polarization multiplexing signals and the second-path polarization multiplexing signals by using the filter coefficients on which the initialization update is performed, to obtain initialized x-path signals and initialized y-path signals; and a synchronizer 408, configured to synchronize preset x-path training sequences and y-path training sequences by using the initialized x-path signals and the initialized y-path optical signals, and if the synchronization result indicates that polarization cross occurs, rectify the polarization cross.

The apparatus for processing signals of this embodiment may further include:

a local laser 401, configured to generate local oscillation signals; and a polarization beam splitter 402, configured to split the local oscillation signals and the input signals and input the split signals into the frequency mixer 403.

The polarization compensator 407 in this embodiment may be further configured to perform a working update process on the filter coefficients, and perform polarization compensation on new first-path polarization multiplexing signals and new second-path polarization multiplexing signals by using the filter coefficients on which the working update is performed, to obtain working x-path signals and working y-path signals.

Based on the additional function executed by the polarization compensator 407, the apparatus for processing signals in this embodiment may further include:

a phase restorer 409, configured to perform phase restoration on the working x-path signals according to the preset x-path training sequences to obtain x-path output signals, and perform phase restoration on the working y-path signals according to the preset y-path training sequences to obtain y-path output signals; and a decoder 410, configured to decode the x-path output signals and the y-path output signals.

Figure 5:
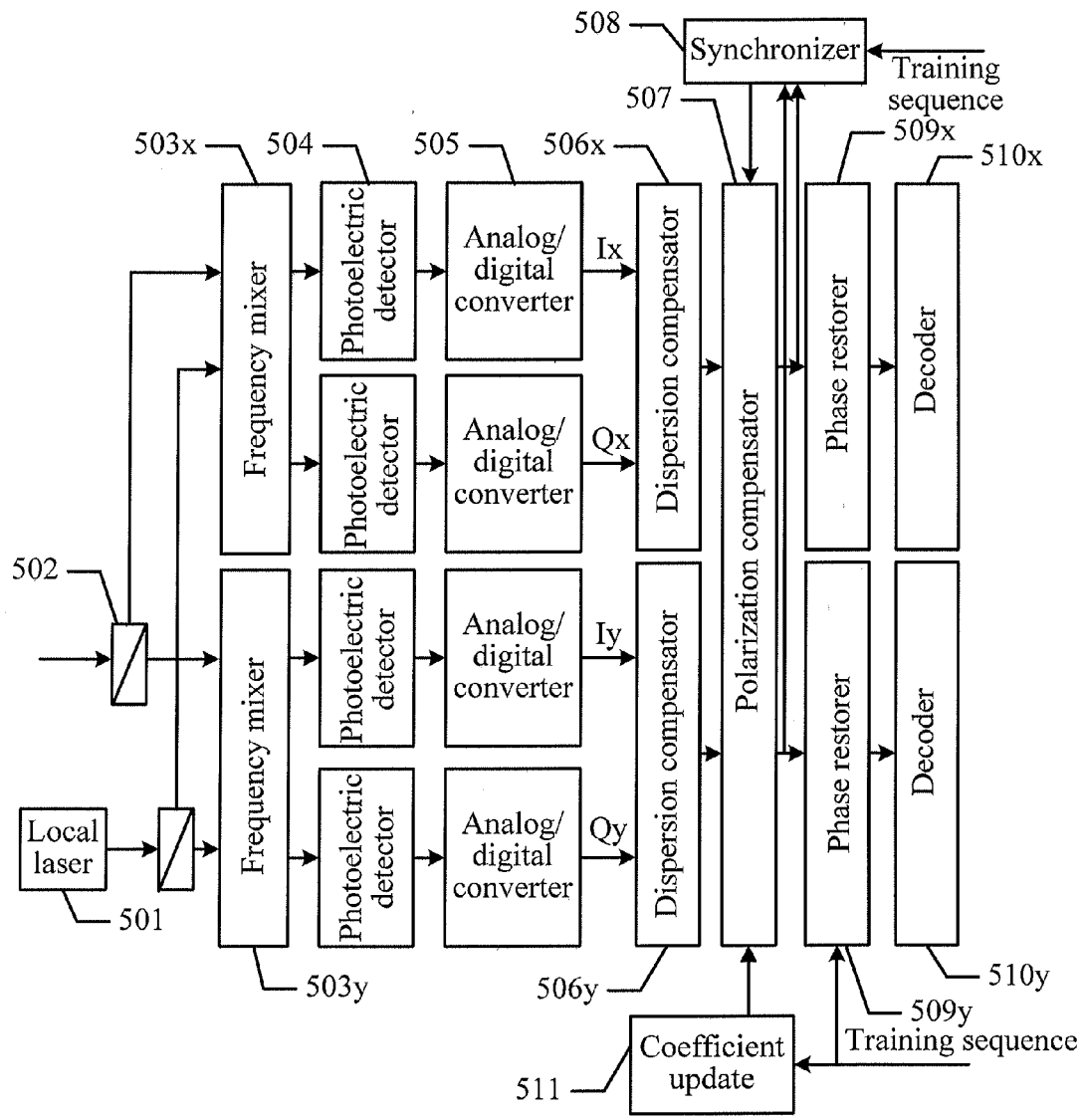
FIG. 5 is a schematic flow chart of processing signals according to an embodiment.

For ease of understanding, connection among components of the apparatus for processing signals is described in detail below through a specific application scenario, as shown in FIG. 5.

When input signals are received, the input signals are divided into x/y-path signals through a polarization beam splitter 502. The x/y-path signals are fed into 90° frequency mixers 503x and 503y, respectively, and meanwhile, a local laser 501 generates local oscillation signals. The local oscillation signals are divided into x/y-path signals through the polarization beam splitter 502 in the same way, and the x/y-path signals are fed into the 90° frequency mixers 503x and 503y, respectively. The 90° frequency mixers 503x and 503y each output two paths of frequency mixing signals.

The four paths of frequency mixing signals are input into four photoelectric detectors 504 respectively for photoelectric detection, and then four paths of detection signals are output after completion of the photoelectric detection.

The four paths of detection signals are input into four analog/digital converters 505 respectively for analog/digital conversion, and four paths of digital signals are output after completion of the analog/digital conversion, which are $I_x$, $Q_x$, $I_y$, and $Q_y$, respectively.

$I_x$ and $Q_x$ are input into a dispersion compensator 506x for dispersion compensation, and then first-path polarization multiplexing signals are output. $I_y$ and $Q_y$ are input into a dispersion compensator 506y for dispersion compensation, and then second-path polarization multiplexing signals are output.

An initialization update process is performed on filter coefficients of an adaptive filter in a polarization compensator 507, and the initialization update process refers to update of the filter coefficients in an initialization state. It should be noted that, upon the startup operation, the apparatus for processing signals in this embodiment may first get into an initialization state to perform operations such as parameter debug and rectification of polarization cross.

The initialization update process may specifically adopt blind equalization coefficient update, and the specific update manner may be as follows.

A constant modulus algorithm is applied, and the modulus of the initialized x-path signals and the modulus of the initialized y-path signals are kept constant, where the initialized x-path signals and the initialized y-path signals are output by the polarization compensator. Since input first-path polarization multiplexing signals and input second-path polarization multiplexing signals may dynamically change, the filter coefficients may be updated according to a constant modulus principle.

It should be noted that, the blind equalization coefficient update may be blind equalization coefficient update without decision feedback.

After the completion of the update of the filter coefficients, the obtained first-path polarization multiplexing signals and the obtained second-path polarization multiplexing signals may be input into the polarization compensator 507 simultaneously for polarization compensation.

Figure 6:
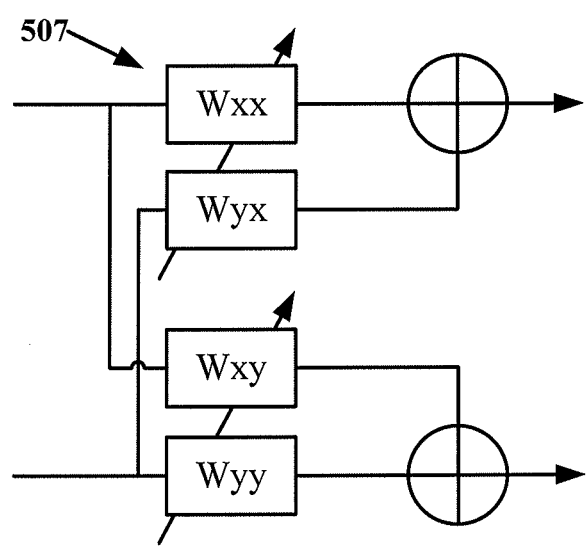
FIG. 6 is a schematic diagram of a polarization compensator according to an embodiment.

A specific structure of the polarization compensator 507 in this embodiment may be as shown in FIG. 6, where $W_{xx}$, $W_{yx}$, $W_{xy}$, and $W_{yy}$ are the filter coefficients of adaptive filters, $W_{xx}$ and $W_{yx}$ are filter coefficients of an x-path filter, and $W_{xy}$ and $W_{yy}$ are filter coefficients of a y-path filter.

After the polarization compensator 507 performs polarization compensation on the first-path polarization multiplexing signals and the second-path polarization multiplexing signals to obtain the initialized x-path signals and the initialized y-path signals, a synchronizer 508 may synchronize the preset x-path training sequences and the preset y-path training sequences by using the initialized x-path signals and the initialized y-path signals.

It should be noted that, in this embodiment, the apparatus for processing signals is preset with the x-path training sequences and y-path training sequences.

The specific synchronization process of the synchronizer 508 may be as follows.

The initialized x-path signals are correlated with the x-path training sequences to obtain a first correlated peak, the initialized y-path signals are correlated with the y-path training sequences to obtain a second correlated peak, the initialized x-path signals are correlated with the y-path training sequences to obtain a third correlated peak, and the initialized y-path signals are correlated with the x-path training sequences to obtain a fourth correlated peak.

In this embodiment, if the first correlated peak and the second correlated peak are both greater than or equal to a preset threshold, and the third correlated peak and the fourth correlated peak are both less than the preset threshold, it is determined that the polarization cross does not occur.

If the third correlated peak and the fourth correlated peak are both greater than or equal to the preset threshold, and the first correlated peak and the second correlated peak are both less than the preset threshold, it is determined that the polarization cross occurs.

When it is determined that the polarization cross occurs, the polarization compensator 507 may exchange the filter coefficients of the x-path filter for the filter coefficients of the y-path filter, that is, exchange $W_{xx}$ for $W_{xy}$; and exchange $W_{yx}$ for $W_{yy}$, so that the x-path filter can output the initialized x-path signals and the y-path filter can output the initialized y-path signals, so as to rectify polarization cross.

It should be noted that, if the synchronization result indicates that polarization cross does not occur, or after the polarization cross is rectified, the apparatus for processing signals may get into a working state from an initialization state.

In the working state, the local laser 501, the polarization beam splitter 502, the 90° frequency mixer 503$x$, the 90° frequency mixer 503$y$, the photoelectric detector 504, the analog/digital converter 505, the dispersion compensator 506$x$ and the dispersion compensator 506$y$ execute operations in the same processing manner as that for the apparatus for processing signals in the initialization state, and details are not described in detail herein again.

The apparatus for processing signals in the working state may perform a working update process on the filter coefficients of the polarization compensator 507.

The working update process in this embodiment may specifically adopt blind equalization coefficient update, and the specific update manner may be as follows.

A constant modulus algorithm is applied, and the modulus of the working x-path signals and the modulus of the working y-path signals are kept constant, where the working x-path signals and the working y-path signals are output by the polarization compensator 507. Since newly input first-path polarization multiplexing signals and newly input second-path polarization multiplexing signals may dynamically change, the filter coefficients may be updated according to a constant modulus principle.

It should be noted that, the blind equalization coefficient update may be blind equalization coefficient update without decision feedback or may also be blind equalization coefficient update with decision feedback.

It can be understood that, in actual applications, the working update process may be performed through other manners in addition to adoption of the blind equalization coefficient update, such as adoption of training sequence auxiliary coefficient update, and the specific update manner may be as follows.

The apparatus for processing signals updates the filter coefficients with the training sequences as a target, and makes them approximate the training sequences as much as possible. The filter coefficients of the x-path filter are updated by using the x-path training sequences, and the filter coefficients of the y-path filter are updated by using the y-path training sequences.

In this embodiment, after the polarization compensator 507 obtains the working x-path signals and the working y-path signals, a phase restorer 509$x$ may perform phase restoration on the working x-path signals according to the preset x-path training sequences to obtain x-path output signals, and a phase restorer 509$y$ may perform phase restoration on the working y-path signals according to the preset y-path training sequences to obtain y-path output signals.

The specific phase restoration manner may be as follows.

The phase restorer 509$x$ estimates an initial phase of the working x-path signals by using periodical x-path training sequences, and then according to the initial phase of the working x-path signals, tracks the phase change of the working x-path signals by using a phase locked loop, so as to perform phase restoration.

The manner in which the phase restorer 509$y$ performs phase restoration on the working y-path signals is similar, and details are not described herein again.

After the x-path output signals and the y-path output signals are obtained, decoders 510$x$ and 510$y$ decode the x-path output signals and the y-path output signals respectively to obtain original signals, and the specific process is not limited herein.

In this embodiment, after obtaining the first-path polarization multiplexing signals and the second-path polarization multiplexing signals, the apparatus for processing signals may first perform polarization compensation on the first-path polarization multiplexing signals and the second-path polarization multiplexing signals, and then perform synchronization of the training sequences. Since the signals of different paths may be separated through the polarization compensation, during synchronization of the training sequences, impairment of the signals may not affect the synchronization, thereby effectively improving synchronization stability of the signals.

In this embodiment, when updating the filter coefficients, the apparatus for processing signals may adopt blind equalization coefficient update or training sequence auxiliary coefficient update, so as to improve flexibility of the solution.

Those of ordinary skill in the art should understand that all or a part of the steps of the method according to the embodiments may be implemented by a program instructing relevant hardware. The program may be stored in a computer readable storage medium, which may be a read-only memory, a magnetic disk, or a disk.

The method and the apparatus for processing signals are described in detail above. It is understood that persons of ordinary skill in the art may make variations to the specific embodiments. Such modified embodiments are understood to fall within the scope of the claims. The embodiments should not be construed as a limit on the claims.

What is claimed is:

1. A method for processing signals, comprising:
   obtaining first-path polarization multiplexing signals and second-path polarization multiplexing signals by performing frequency mixing, photoelectric detection, analog/digital conversion, and dispersion compensation on received input signals;
   performing an initialization update process on filter coefficients;
   performing polarization compensation on the first-path polarization multiplexing signals and the second-path polarization multiplexing signals by using the filter coefficients on which the initialization update is performed, to obtain initialized x-path signals and initialized y-path signals;
   synchronizing preset x-path training sequences and y-path training sequences by using the initialized x-path signals and the initialized y-path signals; and
   if a synchronization result indicates that polarization cross occurs, rectifying the polarization cross.

2. The method according to claim 1, wherein if the synchronization result indicates that the polarization cross does not occur, or after the polarization cross is rectified, the method further comprises:
   performing a working update process on the filter coefficients;
   performing polarization compensation on new first-path polarization multiplexing signals and new second-path polarization multiplexing signals by using the filter coefficients on which the working update is performed, to obtain working x-path signals and working y-path signals;
   performing phase restoration on the working x-path signals according to the preset x-path training sequences to obtain x-path output signals;
   performing phase restoration on the working y-path signals according to the preset y-path training sequences to obtain y-path output signals; and
   decoding the x-path output optical signals and the y-path output signals.

3. The method according to claim 1, wherein the synchronizing the preset x-path training sequences and the preset y-path training sequences by using the initialized x-path signals and the initialized y-path signals comprises:
   correlating the initialized x-path signals with the x-path training sequences to obtain a first correlated peak;
   correlating the initialized y-path signals with the y-path training sequences to obtain a second correlated peak;
   correlating the initialized x-path signals with the y-path training sequences to obtain a third correlated peak; and
   correlating the initialized y-path signals with the x-path training sequences to obtain a fourth correlated peak.

4. The method according to claim 2, wherein the synchronizing the preset x-path training sequences and the preset y-path training sequences by using the initialized x-path signals and the initialized y-path signals comprises:
   correlating the initialized x-path signals with the x-path training sequences to obtain a first correlated peak;
   correlating the initialized y-path signals with the y-path training sequences to obtain a second correlated peak;
   correlating the initialized x-path signals with the y-path training sequences to obtain a third correlated peak; and
   correlating the initialized y-path signals with the x-path training sequences to obtain a fourth correlated peak.

5. The method according to claim 3, further comprising:
   if the first correlated peak and the second correlated peak are both greater than or equal to a preset threshold, and the third correlated peak and the fourth correlated peak are both less than the preset threshold, determining that the polarization cross does not occur;
   if the third correlated peak and the fourth correlated peak are both greater than or equal to the preset threshold, and the first correlated peak and the second correlated peak are both less than the preset threshold, determining that the polarization cross occurs.

6. The method according to claim 4, further comprising:
   if the first correlated peak and the second correlated peak are both greater than or equal to a preset threshold, and the third correlated peak and the fourth correlated peak are both less than the preset threshold, determining that the polarization cross does not occur;
   if the third correlated peak and the fourth correlated peak are both greater than or equal to the preset threshold, and the first correlated peak and the second correlated peak are both less than the preset threshold, determining that the polarization cross occurs.

7. The method according to claim 1, wherein the performing the initialization update process on the filter coefficients comprises:
   performing a blind equalization coefficient update on filter coefficients of an x-path filter and filter coefficients of a y-path filter in a polarization compensator.

8. The method according to claim 2, wherein the performing the initialization update process on the filter coefficients comprises:
   performing a blind equalization coefficient update on filter coefficients of an x-path filter and filter coefficients of a y-path filter in a polarization compensator.

9. The method according to claim 7, wherein the performing the polarization compensation on the first-path polarization multiplexing signals and the second-path polarization multiplexing signals by using the filter coefficients on which the initialization update is performed, to obtain the initialized x-path signals and the initialized y-path signals comprises:
   performing the polarization compensation on the first-path polarization multiplexing signals by using the filter coefficients of the x-path filter which have undergone the initialization update, to obtain the initialized x-path signals; and
   performing the polarization compensation on the second-path polarization multiplexing signals by using the filter coefficients of the y-path filter which have undergone the initialization update, to obtain the initialized y-path signals.

10. The method according to claim 8, wherein the performing the polarization compensation on the first-path polarization multiplexing signals and the second-path polarization multiplexing signals by using the filter coefficients on which the initialization update is performed, to obtain the initialized x-path signals and the initialized y-path signals comprises:

performing the polarization compensation on the first-path polarization multiplexing signals by using the filter coefficients of the x-path filter which have undergone the initialization update, to obtain the initialized x-path signals; and performing the polarization compensation on the second-path polarization multiplexing signals by using the filter coefficients of the y-path filter which have undergone the initialization update, to obtain the initialized y-path signals.

11. The method according to claim 7, wherein the rectifying the polarization cross comprises:

exchanging the filter coefficients of the x-path filter for the filter coefficients of the y-path filter.

12. The method according to claim 8, wherein the rectifying the polarization cross comprises:

exchanging the filter coefficients of the x-path filter for the filter coefficients of the y-path filter.

13. The method according to claim 2, wherein the performing the working update process on the filter coefficients comprises:

performing blind equalization coefficient update on filter coefficients of an x-path filter and filter coefficients of a y-path filter in a polarization compensator; or, performing training sequence auxiliary coefficient update on filter coefficients of an x-path filter and filter coefficients of a y-path filter in a polarization compensator.

14. An apparatus for processing signals, comprising:

a frequency mixer configured to perform frequency mixing on received input signals;

a photoelectric detector configured to perform photoelectric detection on the signals on which the frequency mixing is performed;

an analog/digital converter configured to perform analog/digital conversion on the signals on which the photoelectric detection is performed;

a dispersion compensator configured to perform dispersion compensation on the signals on which the analog/digital conversion is performed, to obtain first-path polarization multiplexing signals and second-path polarization multiplexing signals;

a polarization compensator configured to perform an initialization update process on filter coefficients, and perform polarization compensation on the first-path polarization multiplexing signals and the second-path polarization multiplexing signals by using the filter coefficients on which the initialization update is performed, to obtain initialized x-path signals and initialized y-path signals; and a synchronizer configured to synchronize preset x-path training sequences and y-path training sequences by using the initialized x-path signals and the initialized y-path signals, and if a synchronization result indicates that polarization cross occurs, rectify the polarization cross.

15. The apparatus for processing signals according to claim 14, wherein, the polarization compensator is further configured to perform a working update process on the filter coefficients, and perform polarization compensation on new first-path polarization multiplexing signals and new second-path polarization multiplexing signals by using the filter coefficients on which the working update is performed, to obtain working x-path signals and working y-path signals; and wherein the apparatus for processing signals further comprises:

a phase restorer configured to perform phase restoration on the working x-path signals according to the preset x-path training sequences to obtain x-path output signals, and perform phase restoration on the working y-path signals according to the preset y-path training sequences to obtain y-path output signals; and a decoder configured to decode the x-path output signals and the y-path output signals.

* * * * *